United States Patent
Taniguchi

(10) Patent No.: US 10,829,153 B1
(45) Date of Patent: Nov. 10, 2020

(54) VEHICLE STEERING CONTROL METHOD AND VEHICLE STEERING CONTROL DEVICE

(71) Applicant: Nissan Motor Co., Ltd., Yokohama (JP)

(72) Inventor: Hiroki Taniguchi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/771,267

(22) PCT Filed: Dec. 12, 2017

(86) PCT No.: PCT/JP2017/044617
§ 371 (c)(1),
(2) Date: Jun. 10, 2020

(87) PCT Pub. No.: WO2019/116453
PCT Pub. Date: Jun. 20, 2019

(51) Int. Cl.
*B62D 15/02* (2006.01)
*B62D 5/04* (2006.01)
*B62D 1/06* (2006.01)

(52) U.S. Cl.
CPC ............. *B62D 15/025* (2013.01); *B62D 1/06* (2013.01); *B62D 5/046* (2013.01); *B62D 15/021* (2013.01)

(58) Field of Classification Search
CPC .... B62D 15/025; B62D 15/021; B62D 5/046; B62D 1/06
See application file for complete search history.

(56) References Cited

U.S. PATENT DOCUMENTS

| 4,657,102 | A | * | 4/1987 | Kanazawa | B62D 7/1572 180/415 |
| 5,850,886 | A | * | 12/1998 | Kouno | B62D 9/00 180/6.24 |
| 6,082,482 | A | * | 7/2000 | Kato | B62D 6/008 180/402 |
| 8,340,871 | B2 | * | 12/2012 | Suzuki | B62D 15/025 701/42 |

(Continued)

FOREIGN PATENT DOCUMENTS

| JP | 2003-137122 A | 5/2003 |
| JP | 2004-268659 A | 9/2004 |

(Continued)

*Primary Examiner* — Russell Frejd
(74) *Attorney, Agent, or Firm* — Global IP Counselors, LLP

(57) ABSTRACT

A steering/turning controller: inputs a target turning angle command created based on travel environment information; determines whether the target turning angle command is a corrective turning region, in which an angle is equal to or less than an angle threshold value and an angular velocity is equal to or greater than an angular velocity threshold value, or a non-corrective turning region other than the corrective turning region; when generating a steering command angle and a turning command angle based on the target turning angle command, sets a distribution of the steering command angle to "zero" and generates only the turning command angle in the case of the corrective turning region; and generates the steering command angle and the turning command angle in the case of the non-corrective turning region.

8 Claims, 7 Drawing Sheets

(56) References Cited

U.S. PATENT DOCUMENTS

| | | | | |
|---|---|---|---|---|
| 2005/0004731 A1* | 1/2005 | Bohm | ............... | B62D 15/025 |
| | | | | 701/41 |
| 2006/0042859 A1* | 3/2006 | Itoh | ............... | B62D 5/003 |
| | | | | 180/402 |
| 2008/0251312 A1* | 10/2008 | Goto | ............... | B62D 6/003 |
| | | | | 180/446 |
| 2017/0080969 A1* | 3/2017 | Ieyasu | ............... | B62D 6/008 |

FOREIGN PATENT DOCUMENTS

| | | |
|---|---|---|
| JP | 2015-3727 A | 1/2015 |
| JP | 2015-9761 A | 1/2015 |
| JP | 2016-97827 A | 5/2016 |
| JP | 6374773 B2 | 8/2018 |
| WO | 2016/162902 A1 | 10/2016 |

* cited by examiner

VEHICLE STEERING CONTROL METHOD AND VEHICLE STEERING CONTROL DEVICE

CROSS-REFERENCE TO RELATED APPLICATIONS

This application is a U.S. national stage application of International Application No. PCT/JP2017/044617, filed on Dec. 12, 2017.

TECHNICAL FIELD

The present invention relates to a method for controlling steering of a vehicle and a device for controlling steering of a vehicle.

BACKGROUND INFORMATION

In the past, during vehicle travel, a target steering angle is calculated through line tracing, lane keeping control, or another autonomous driving control, and a notification is issued with regard to turning of turnable wheels and steering of a steering wheel in accordance with the target steering angle (for example, see Japanese Laid-Open Patent Application No. 2016-97827—Patent Document 1). In the prior art, when the target steering angle is inputted, a control current that drives an electric power steering motor is calculated based on a deviation between an actual steering angle and the target steering angle, the electric power steering motor is driven by the calculated control current, and steering reaction force torque is generated.

SUMMARY

However, when a vehicle is steered by an actuator based on a deviation between a target steering angle and an actual steering angle, corrective turning for finely adjusting a steering angle occurs frequently when, for example, line tracing or lane keeping is to be performed with high precision. When such corrective turning occurs frequently, fine movements such as jerking are generated in a steering wheel, and there is a concern that a sense of discomfort will be imparted to a driver.

The present invention focuses on the above problem, it being an object of the invention to provide a method for controlling steering of a vehicle and a device for controlling steering of a vehicle with which it is possible to suppress a sense of discomfort imparted to a driver even when frequent fine adjustments are made to a turning angle while turning is carried out in response to a target turning angle command.

In a method for controlling steering of a vehicle and a device for controlling steering of a vehicle of the present disclosure, a determination is made as to whether a target turning angle command is a first turning angle command region, in which an angle is equal to or less than a prescribed value and an angular velocity is equal to or greater than a prescribed value, or a second turning angle command region other than the first turning angle command region. When a steering command angle and a turning command angle are generated based on the target turning angle command, a distribution of the steering command angle in cases where the target turning angle command is the first turning angle command region is kept lower than a distribution of the steering command angle in cases where the target turning angle command is the second turning angle command region.

Therefore, when the target turning angle command is inputted, the distribution of the steering command angle is kept lower in the first turning angle command region, in which the angle is equal to or less than a prescribed value and the angular velocity is equal to or greater than a prescribed value, than in the second turning angle command region other than the first turning angle command region, and movement of a steering wheel is minimized. Thus, in cases where, inter alia, corrective turning in which a turning angle is low and a turning angle velocity is high is performed, it is possible to minimize jerking of the steering wheel and minimize a sense of discomfort imparted to a driver.

DETAILED DESCRIPTION OF THE EMBODIMENTS

A preferred embodiment of a steering control method for a vehicle and a steering control device for a vehicle of the present disclosure is described below based on the drawings.

First Embodiment

First, the configuration will be described. A vehicle steering control method and a vehicle steering control device of the first embodiment are applied to a vehicle installed with a steering-by-wire system, in which movement of a steering wheel is converted to an electrical signal and transmitted to left and right front wheels. A configuration of the device for controlling steering of a vehicle of the first embodiment is described below in sections "Overall system configuration," "Configuration of control system," and "Control of steering angle and turning angle during autonomous driving control."

Overall System Configuration

Figure 1:
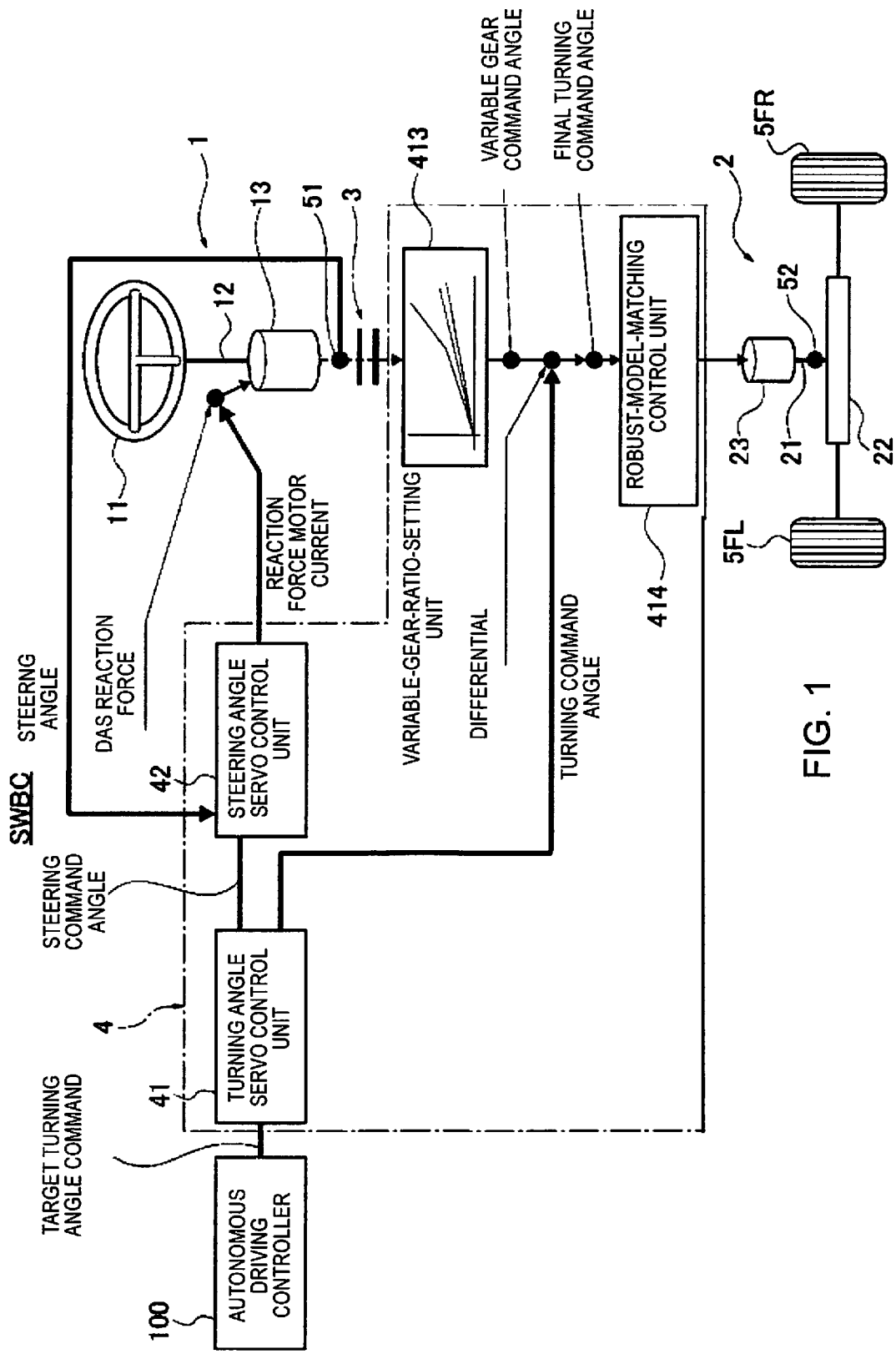
FIG. 1 is an overall schematic system diagram showing a steering-by-wire system to which a steering control method for a vehicle and a steering control device for a vehicle are applied in accordance with a first embodiment.

FIG. 1 shows a steering-by-wire system SBWC to which the vehicle steering control method and the vehicle steering control device are applied in accordance with the first embodiment. An overall system configuration is described below based on FIG. 1.

The steering-by-wire system SBWC is primarily configured from a steering unit 1, a turning unit 2, a steering clutch 3, and a steering/turning controller 4. In the steering-by-wire system SBWC, the steering unit 1, which receives steering input from a driver, and the turning unit 2, which turns left and right front wheels (turnable wheels) 5FL, 5FR, are mechanically detached from each other.

The steering unit 1 comprises a steering wheel 11, a column shaft 12, and a reaction force motor 13. The column shaft 12 rotates integrally with the steering wheel 11.

The reaction force motor 13 is, for example, a brushless motor, and moreover is a coaxial motor in which an output shaft thereof is coaxial with the column shaft 12. During steering by the driver, steering reaction force torque is outputted from the reaction force motor 13 to the column shaft 12 in accordance with a command from the steering/turning controller 4. During autonomous driving control (described below), steering reaction force torque that causes the steering wheel 11 to be actively steered is outputted to the column shaft 12 in accordance with a command from the steering/turning controller 4. The reaction force motor 13 is provided with a steering angle sensor 51 that detects an absolute rotation angle of the column shaft 12, i.e., a steering angle of the steering wheel 11.

The turning unit 2 comprises a pinion shaft 21, a steering gear 22, and a turning motor 23. The steering gear 22 is a rack-and-pinion-type steering gear and turns the left and right front wheels 5FL, 5FR in accordance with rotation of the pinion shaft 21.

The turning motor 23 is, for example, a brushless motor, and moreover is such that an output shaft thereof is connected to the steering gear 22 via a reducer (not shown). Turning torque for turning the steering gear 22 is outputted from the turning motor in accordance with a command from the steering/turning controller 4. The turning motor 23 is provided with a turning angle sensor 52 that detects an absolute rotation angle of the reaction force motor 13, thereby detecting a turning angle of the left and right front wheels 5FL, 5FR.

The steering clutch 3 is provided between the column shaft 12 of the steering unit 1 and the pinion shaft 21 of the turning unit 2. The steering unit 1 and the turning unit 2 are mechanically detached from each other due to disengagement of the steering clutch 3, and are mechanically connected to each other due to engagement of the steering clutch 3.

Configuration of Control System

The steering/turning controller 4 comprises a turning angle servo control unit 41 and a steering angle servo control unit 42. The turning angle servo control unit 41 generates a steering command angle by which the steering wheel 11 is caused to revolve (is steered), and a turning command angle by which the left and right front wheels 5FL, 5FR are caused to turn, based on a target turning angle command from an autonomous driving controller 100. Furthermore, the turning angle servo control unit 41 controls driving of the turning motor 23 of the turning unit 2 based on the turning command angle.

The steering angle servo control unit 42 outputs to the reaction force motor 13 a reaction force motor current, which imparts reaction force to the column shaft 12, causes the steering wheel 11 to revolve by a prescribed angle, etc., based on, inter alia, the steering command angle and the detected steering angle. The reaction force motor 13 imparts, to the column shaft 12, reaction force torque corresponding to steering by the driver during steer-by-wire control, in which the driver performs steering. In addition, the reaction force motor 13 imparts steering reaction force torque by which the steering wheel 11 is caused to revolve (is steered) in accordance with a turning amount of the left and right front wheels 5FL, 5FR to the column shaft 12 during autonomous driving control, in which the driver does not perform steering.

A configuration of the steering/turning controller 4 is described next in greater detail based on FIG. 2. The steering/turning controller 4 is configured from two onboard control modules IDM, DAS, and the turning angle servo control unit 41 and the steering angle servo control unit 42 described above are configured so as to span the two control modules IDM, DAS.

The turning angle servo control unit 41 comprises a steering angle/turning angle ratio-adjusting unit 411, a steering angle delay compensation unit 412, a variable-gear-ratio-setting unit 413, and a robust-model-matching control unit 414.

The steering angle/turning angle ratio-adjusting unit 411 adjusts a ratio (distribution) of the steering command angle relative to the target turning angle command based on the target turning angle command from the autonomous driving controller 100, and has a function of a band-pass filter. Specifically, the steering angle/turning angle ratio-adjusting unit 411 keeps a distribution of the steering command angle lower in a corrective turning region, in which the target turning angle command is an angle and an angular velocity that are suitable for corrective turning, than in a non-corrective turning region. In particular, in the first embodiment, the steering angle/turning angle ratio-adjusting unit 411 conducts only turning of the left and right front wheels 5FL, 5FR so that the distribution of the steering command angle reaches "zero" and the steering wheel 11 is not steered in the case of the corrective turning region.

In addition, in the case of the non-corrective turning region, in which the target turning angle command is not an angle and an angular velocity that are suitable for corrective turning, the steering angle/turning angle ratio-adjusting unit 411 generates a steering command angle based on the target turning angle command and conducts both steering of the steering wheel 11 and turning of the left and right front wheels 5FL, 5FR Specifically, when the left and right front wheels 5FL, 5FR are turned in accordance with the target turning angle command in cases where the driver is not steering the steering wheel 11 during the autonomous driving control, the steering wheel 11 is also steered in accordance with the turning angle and the driver is informed of a turning direction.

Figure 3:
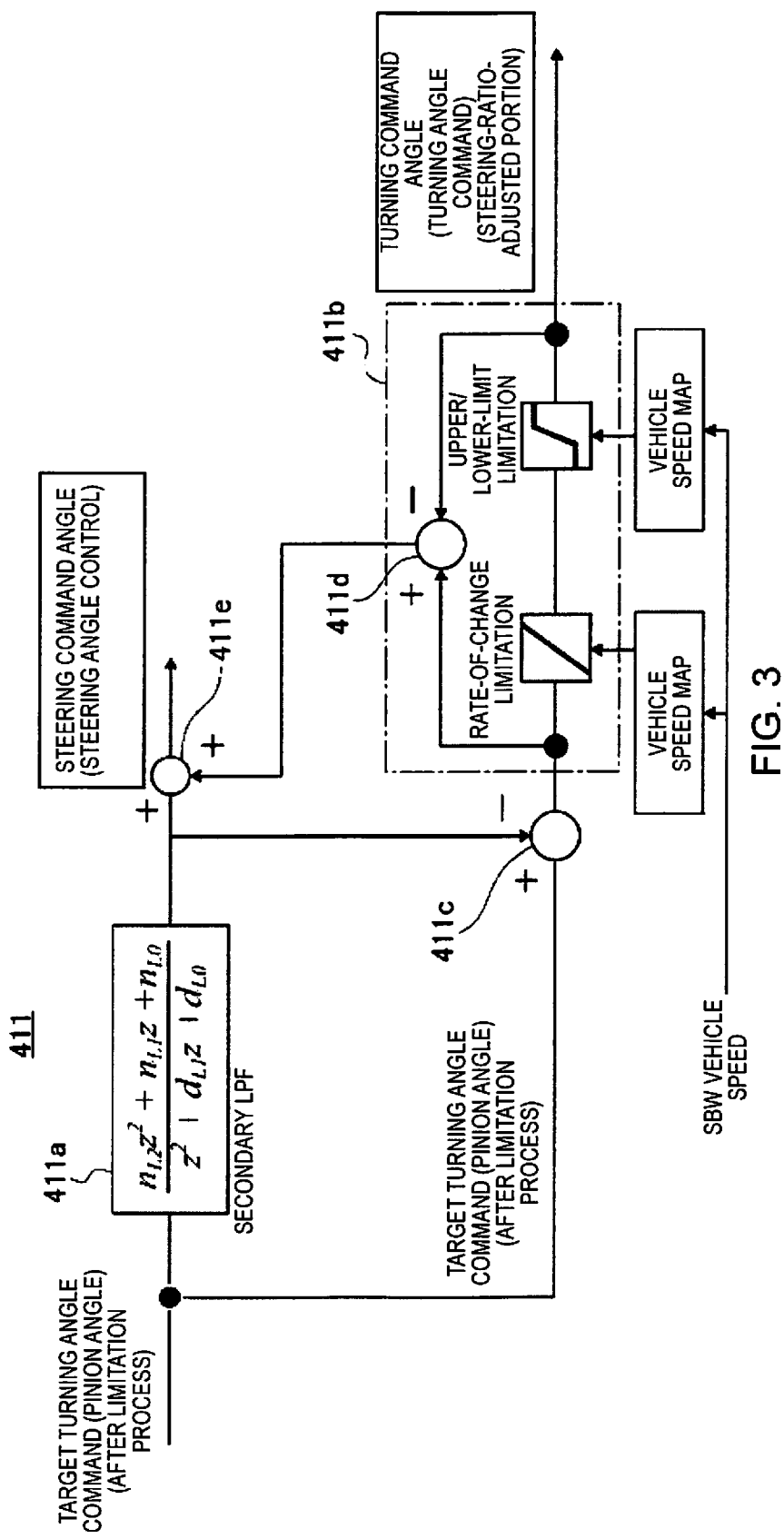
FIG. 3 is a block diagram showing an essential portion of the control system of the steering-by-wire system.

FIG. 3 is a block diagram showing the steering angle/turning angle ratio-adjusting unit 411. The steering angle/turning angle ratio-adjusting unit 411 comprises a secondary low-pass filter 411a and a limiter unit 411b.

The secondary low-pass filter 411a allows passage of a low-frequency component of the target turning angle command, the low-frequency component being a turning angle corresponding to gradual, extended-movement-range steering. The limiter unit 411b receives as input a high-frequency component of the target turning angle command, the high-frequency component being obtained by subtracting the low-frequency component from the target turning angle command using a subtraction unit 411c. The limiter unit 411b passes, from the high-frequency component of the target turning angle command, a portion of a region (corrective turning region) shown in FIG. 4, the region being equal to or less than an angle threshold value θlim and being such that a turning angular velocity (rate of change) is equal to or greater than an angular velocity threshold value ωlim (with an upper limit ωh). Specifically, the target turning angle command of a corrective turning region, which is equal to or less than the angle threshold value θlim and equal to or greater than the angular velocity threshold value ωlim, is a command value that corresponds to corrective turning during a line-tracing control (described below).

A subtraction unit 411d subtracts, from the high-frequency component, the target turning angle command of the corrective turning region, the target turning angle command having passed through the limiter unit 411b, and the resulting difference is added to the low-frequency component of the target turning angle command in an addition unit 411e.

Figure 4:
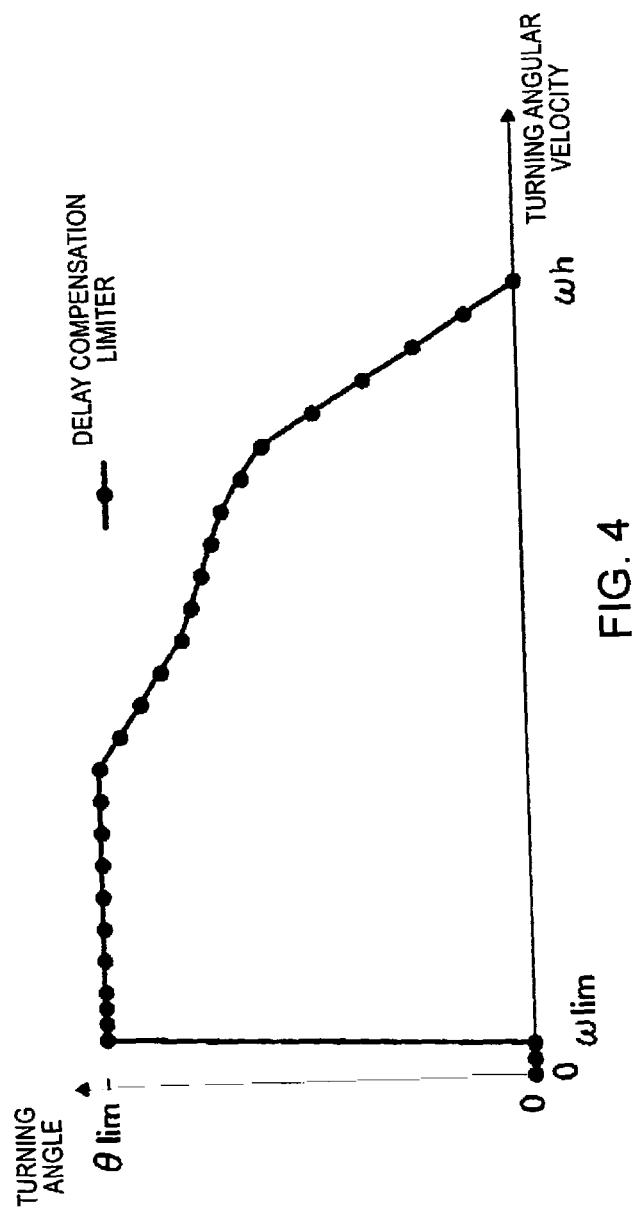
FIG. 4 is a characteristic graph for a limiter in the essential portion of the control system of the steering-by-wire system.

Therefore, the steering command angle outputted from the steering angle/turning angle ratio-adjusting unit 411 to the steering angle servo control unit 42 is such that a portion of the corrective turning region (region in FIG. 4 that is equal to or less than the angle threshold value θlim, equal to or greater than the angular velocity threshold value ωlim, and equal to or less than the upper limit value θh) shown in FIG. 4 is removed. In the first embodiment, a value of approximately 5 deg, or more preferably a value of approximately 3.3 deg, is used as the angle threshold value θlim for determining the corrective turning region, although these values can differ slightly depending on a vehicle speed. A value within the range of 5-10 deg/s is used as the angular velocity threshold value ωlim for determining the corrective turning region.

Figure 2:
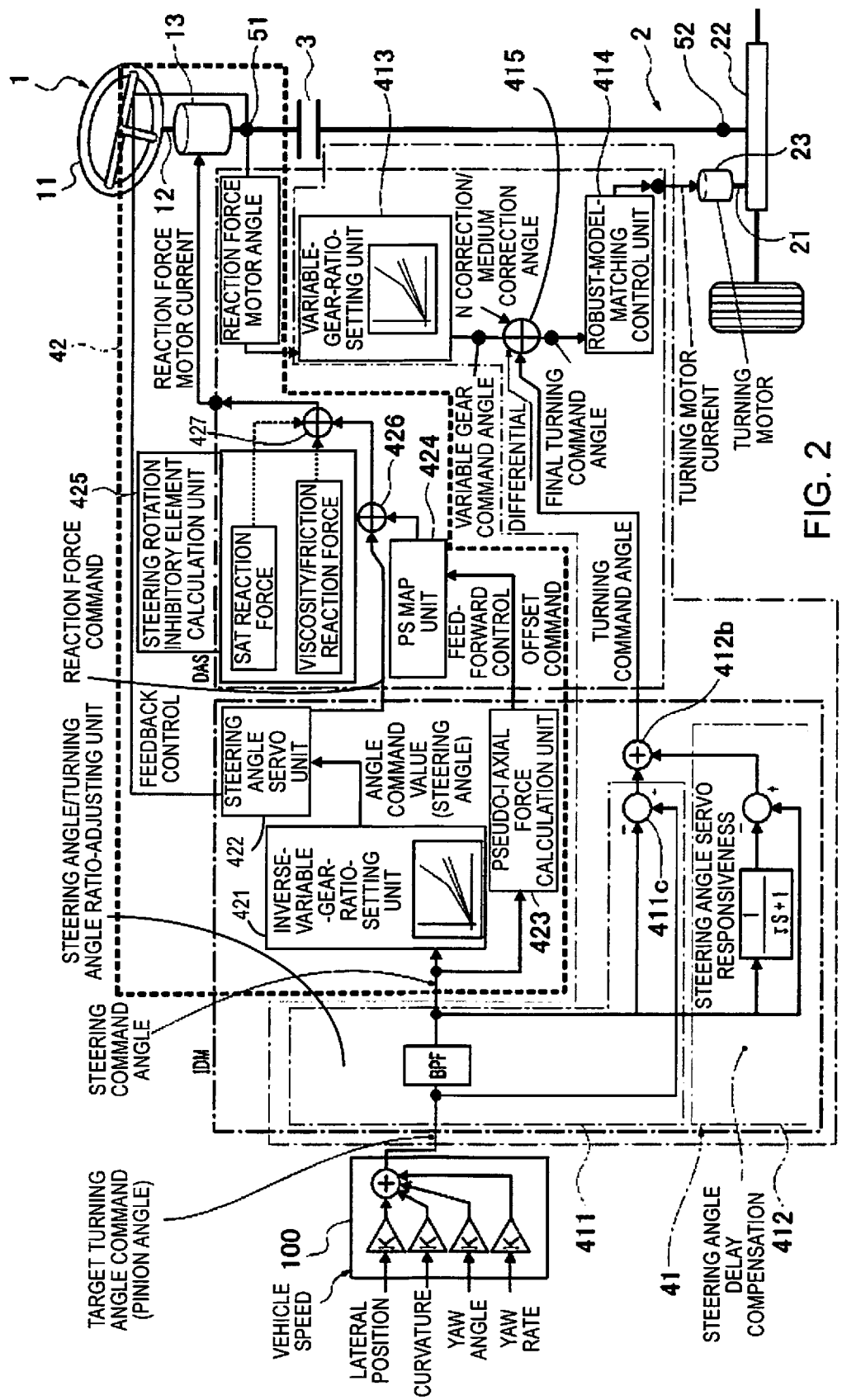
FIG. 2 is a block diagram showing a control system of the steering-by-wire system.

The description now returns to FIG. 2. The steering angle delay compensation unit 412 creates a target turning command by applying an amount commensurate with a delay derived from a weight of the steering wheel 11. Specifically, in the steering angle delay compensation unit 412, an amount commensurate with a primary delay is subtracted from a low-frequency component of the target turning angle command that indicates gradual, extended-movement-range steering in a subtraction unit 412a, and the resulting difference is added (by an addition unit 412b) to a turning command angle, whereby there is obtained a turning command angle to which an amount commensurate with the delay derived from the weight of the steering wheel 11 is added.

In cases where steering of the steering wheel 11 is performed, the variable-gear-ratio-setting unit 413 variably sets a gear ratio, which is a ratio of the turning angle relative to the steering angle, in accordance with the vehicle speed, etc., when causing the left and right front wheels 5FL, 5FR to turn by an angle corresponding to the steering angle.

A variable gear command angle and a turning command angle that is generated in accordance with the target turning angle command are added together in an addition unit 415 to generate a final turning command angle. Specifically, during steer-by-wire control, the variable gear command angle is used as the final turning command angle. However, during autonomous driving control, a value obtained by adding the variable gear command angle and the turning command angle is used as the final turning command angle. The robust-model-matching control unit 414 optimizes the final turning command angle according to a robust model that is set in advance, and outputs the optimized angle to the turning motor 23 as a turning motor current.

The steering angle servo control unit 42 is described next. The steering angle servo control unit 42 comprises an inverse-variable-gear-ratio-setting unit 421, a steering angle servo unit 422, a pseudo-I axial force calculation unit 423, a PS map unit 424, and a steering rotation inhibitory element calculation unit 425.

The inverse-variable-gear-ratio-setting unit 421 generates an angle command value (steering angle) obtained by applying, to the steering command angle generated in the steering angle/turning angle ratio-adjusting unit 411, a gear ratio that is the inverse of that used in the variable-gear-ratio-setting unit 413, and outputs the generated value to the steering angle servo unit 422.

The steering angle servo unit 422 generates and outputs a reaction force command, which is a command for controlling generated torque from the reaction force motor 13 so that the steering wheel 11 is caused to revolve (is steered) in a manner following the angle command value (steering angle). The steering angle servo unit 422 performs a feedback control based on the steering angle detected by the steering angle sensor 51 when following the angle command value (steering angle). Specifically, the steering angle servo unit 422 generates the reaction force command in accordance with a deviation between the angle command value and a detected steering angle. The reaction force command is used as a steering command during autonomous driving control.

An output of the PS map unit 424 is added to an output of the steering angle servo unit 422 by an addition unit 426. The pseudo-I axial force calculation unit 423 and the PS map unit 424 perform a feedforward control derived from an offset command on the reaction force command.

In the steering rotation inhibitory element calculation unit 425, a steering reaction force torque (SAT reaction force) generated by a tire lateral force, and/or steering reaction force torque derived from viscosity or friction in the steering unit 1, is added by an addition unit 427. The steering reaction force torque is computed based on, inter alia, a tire-lateral-force-to-steering-reaction-force-torque conversion map.

Generation of the target turning angle command in the autonomous driving controller 100 is described next in a simple manner. The autonomous driving controller 100 executes, as an autonomous driving control, a line tracing control for controlling turning of the left and right front wheels 5FL, 5FR so that a host vehicle is caused to travel along white lines on a road. As the line tracing control, a stability control for the purpose of improving stability of the vehicle with respect to interference (lateral wind, bumpiness of a road surface, ruts, cant of the road surface, etc.) is executed based on a lateral position, a curvature, a yaw angle, and a yaw rate, and the target turning angle command is generated.

As the stability control, a yaw angle feedback control and a lateral position feedback control are executed. In the yaw angle feedback control, a turning angle is corrected in accordance with a yaw angle, which is an angle formed by the white lines and a travel direction of the host vehicle, and the yaw angle occurring due to interference is reduced. In the lateral position feedback control, the turning angle is corrected in accordance with a distance to the white lines (lateral position), and a change in lateral position, which is an integral value of the yaw rate occurring due to interference, is reduced.

Figure 5:
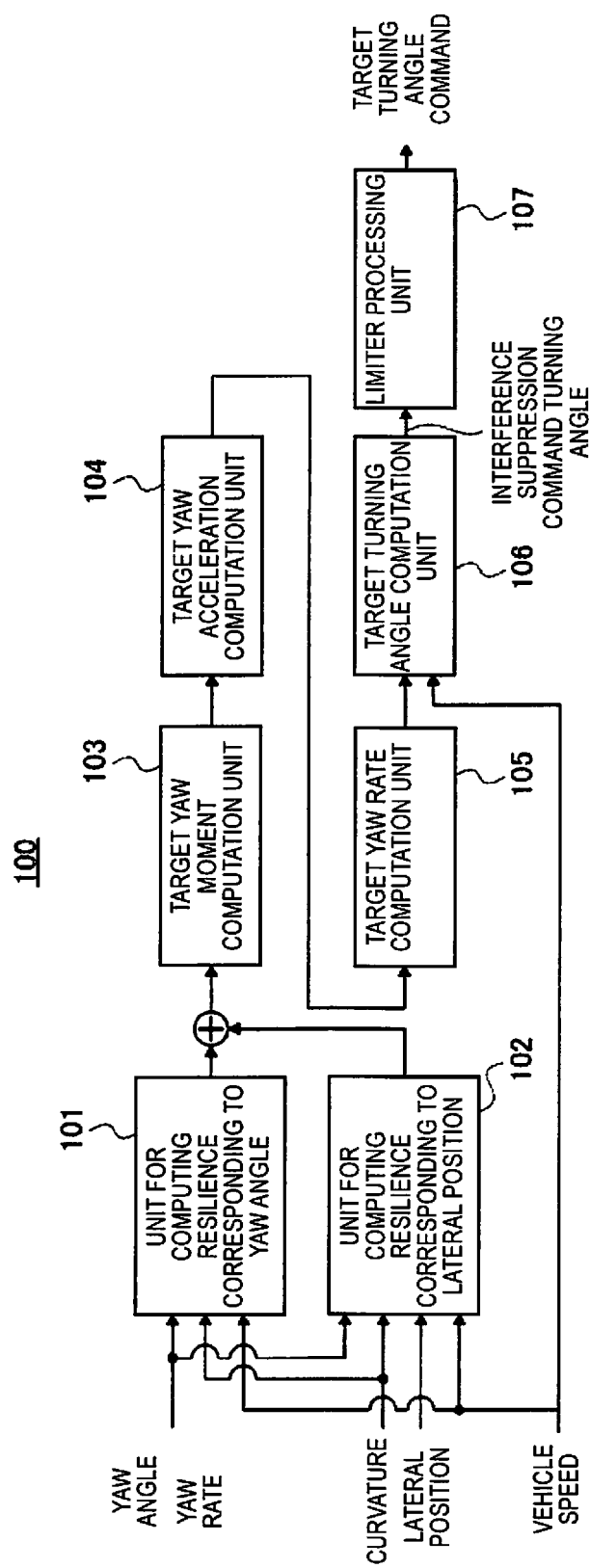
FIG. 5 is a block diagram showing another essential portion of the control system of the steering-by-wire system.

Specifically, as shown in FIG. 5, the autonomous driving controller 100 is configured so as to form the target turning angle command, and comprises a unit 101 for computing resilience corresponding to the yaw angle, a unit 102 for computing resilience corresponding to the lateral position, a target yaw moment computation unit 103, a target yaw acceleration computation unit 104, a target yaw rate computation unit 105, and a target turning angle computation unit 106.

The unit 101 for computing resilience corresponding to the yaw angle computes a vehicle resilience based on the yaw angle, the curvature, and the vehicle speed, the resilience being for reducing the yaw angle occurring due to interference in the yaw angle feedback control.

The unit 102 for computing resilience corresponding to the lateral position computes a vehicle resilience based on the yaw angle, the curvature, the vehicle speed, and the lateral position, the resilience being for reducing the change in the lateral position occurring due to interference in the lateral position feedback control.

The target yaw moment computation unit 103 sets, as a target yaw moment, a value obtained by multiplying a wheel base and a proportion of rear-wheel axle load to vehicle weight, with respect to a horizontal direction resilience obtained by adding the vehicle resilience for reducing the yaw angle and the vehicle resilience for reducing the change in lateral position.

The target yaw acceleration computation unit 104 computes a target yaw acceleration by multiplying the target yaw moment by a yaw inertia moment coefficient. The target yaw rate computation unit 105 computes a target yaw rate by multiplying the target yaw acceleration by a headway time.

The target turning angle computation unit 106 computes an interference suppression command turning angle $\delta st^*$ based on the target yaw rate $\Phi^*$, the wheel base WHEEL_BASE, the vehicle speed V, the vehicle characteristic speed vCh, etc. The interference suppression command turning angle $\delta st^*$ can be derived according to computation formula (1) below. The vehicle characteristic speed vCh is a parameter in a known "Ackerman equation" and represents a self-steering characteristic of the vehicle.

$$\delta st^* = (\Phi^* \times \text{WHEEL\_BASE} \times (1+(V/vCh)2) \times 180)/(V \times M\_PI) \quad \text{Formula (1):}$$

M_PI is a prescribed coefficient.

A limiter processing unit 107 limits an upper limit of a maximum value and a rate of change of the interference suppression command turning angle $\delta st^*$. In a conventional steering device, the maximum value is set to a turning angle range (e.g., 0.2° to the left and right) of the left and right front wheels 5FL, 5FR that corresponds to an angle range of play (e.g., 3° to the left and right) near a neutral position when the steering angle of the steering wheel 11 is within the range of play. A conventional steering device is one in which the steering unit 1 and the turning unit 2 are mechanically connected.

Control of Steering Angle and Turning Angle During Autonomous Driving Control

Figure 6:
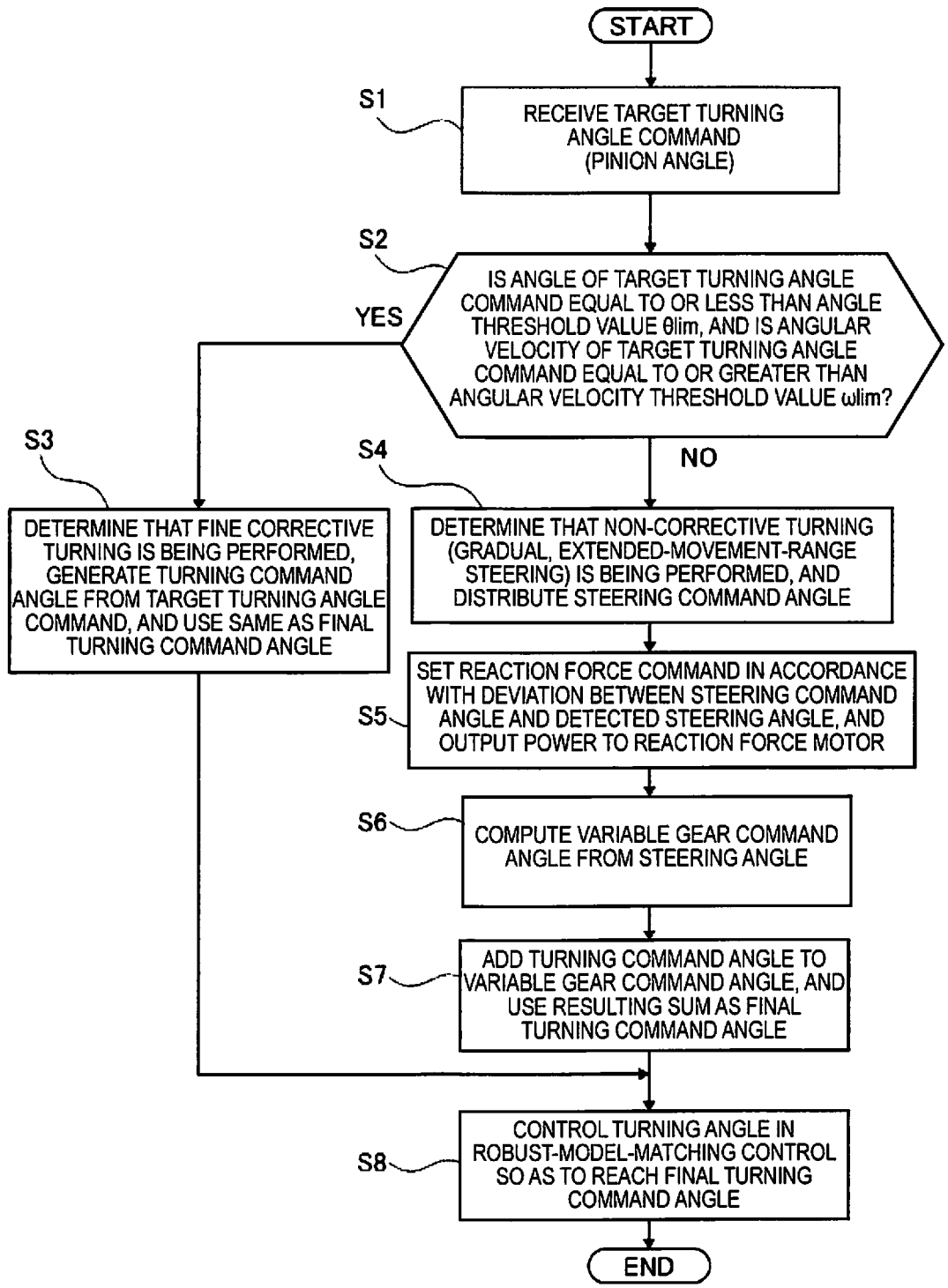
FIG. 6 is a flow chart showing a flow of processes in control of a reaction force motor and a turning motor according to the steering-by-wire system.

A control of the steering angle and the turning angle during autonomous driving control by the steering/turning controller 4 described above is described below based on the flow chart in FIG. 6. This control starts during the autonomous driving control while the vehicle is traveling, and involves turning the left and right front wheels 5FL, 5FR in accordance with the target turning angle command from the autonomous driving controller 100 and steering the steering wheel 11 so as to notify the driver of the turning.

In step S1, the target turning angle command is received from the autonomous driving controller 100 by the turning angle servo control unit 41.

In a subsequent step S2, a determination is made as to whether the target turning angle command is the corrective turning region, in which the angle of the target turning angle command is equal to or less than the angle threshold value $\theta$lim and the angular velocity of the target turning angle command is equal to or greater than the angular velocity threshold value $\omega$lim. When the target turning angle command is the corrective turning region, i.e., is equal to or less than the angle threshold value $\theta$lim and equal to or greater than the angular velocity threshold value $\omega$lim, the sequence proceeds to step S3; when the target turning angle command is a non-corrective turning region, i.e., is not equal to or less than the angle threshold value $\theta$lim or is not equal to or greater than the angular velocity threshold value $\omega$lim, the sequence proceeds to step S4.

In step S3, to which the sequence proceeds in the case of the corrective turning region in which the angle and angular velocity of the target turning angle command are equal to or less than the angle threshold value $\theta$lim and equal to or greater than the angular velocity threshold value $\omega$lim, respectively, a determination is made as to whether the target turning angle command is fine corrective turning. The turning command angle is generated from the target turning angle command and used as the final turning command angle. Specifically, in the turning angle servo control unit 41, a configuration is adopted so that the distribution of the steering command angle to the steering angle servo control unit 42 reaches "zero" and the steering wheel 11 is not steered. The turning command angle is outputted from the turning angle servo control unit 41 to only the turning unit 2, the final turning command angle is generated from the turning command angle, and the left and right front wheels 5FL, 5FR are turned.

However, in step S4, to which the sequence proceeds in the case of the non-corrective turning region in which the angle and angular velocity of the target turning angle command are not equal to or less than the angle threshold value $\theta$lim or not equal to or greater than the angular velocity threshold value $\omega$lim, respectively, it is determined that non-corrective turning (gradual, extended-movement-range steering) is being performed. The steering command angle is distributed to the steering angle servo control unit 42 by the turning angle servo control unit 41. In a subsequent step S5, a reaction force command (performs a feedback control) is generated in the steering angle servo unit 422 of the steering angle servo control unit 42 in accordance with the deviation between the steering command angle and the detected steering angle. An offset command derived from the feedforward control and an element portion that inhibits rotation of the steering wheel 11 are added together, and a reaction force motor current is outputted to drive the reaction force motor 13.

In a subsequent step S6, the variable gear command angle, which is a turning angle that responds to the steering angle, is computed by the variable-gear-ratio-setting unit 413 from the steering angle detected by the steering angle sensor 51. The variable gear command angle varies with respect to the steering angle in accordance with the vehicle speed. In step S7, the variable gear command angle and the turning command angle generated in the turning angle servo control unit 41 are added together, and the resulting sum is used as the final turning command angle. When the determination in step S2 yields YES, no steering command angle is generated, and therefore the final turning command angle is generated through only the turning command angle generated in step S3.

In step S8, the turning motor 23 is driven, according to the robust-model-matching control in the robust-model-matching control unit 414, so that the turning angle (tire angle) of the left and right front wheels 5FL, 5FR reaches the final turning command angle.

Effect of the First Embodiment

Effects of the device for controlling steering of a vehicle of the first embodiment are described below. In the description of the effects, issues resolved by the device for controlling steering of a vehicle of the first embodiment are described based on comparative examples. The comparative examples illustrate cases when the turning command angle and the steering command angle are generated from the target turning angle command received from the autonomous driving controller 100, irrespective of a steering region and a non-steering region, and the distribution of the turning command angle is the same in both regions.

In this case, when the left and right front wheels 5FL, 5FR are turned, the steering wheel 11 also revolves (is steered) by an amount that corresponds to the inverse variable gear ratio. This makes it possible for the driver to visually recognize a turning direction and a turning amount due to the revolving of the steering wheel 11 during turning through the autonomous driving.

However, during high-speed travel such as when line tracing control is performed in the autonomous driving control, it is necessary to perform corrective turning through fine steering on a temporally incremented basis. In such a case, the steering wheel 11 revolves incrementally in accordance with the corrective turning, and there is a concern that the steering wheel 11 will simply appear to the driver to be vibrating (jerking), and that a sense of discomfort will be imparted to the driver. When vibration (jerking) occurs in the steering wheel 11 in this manner, the driver is imparted with an impression that movement of the steering wheel is not smooth.

Figure 7:
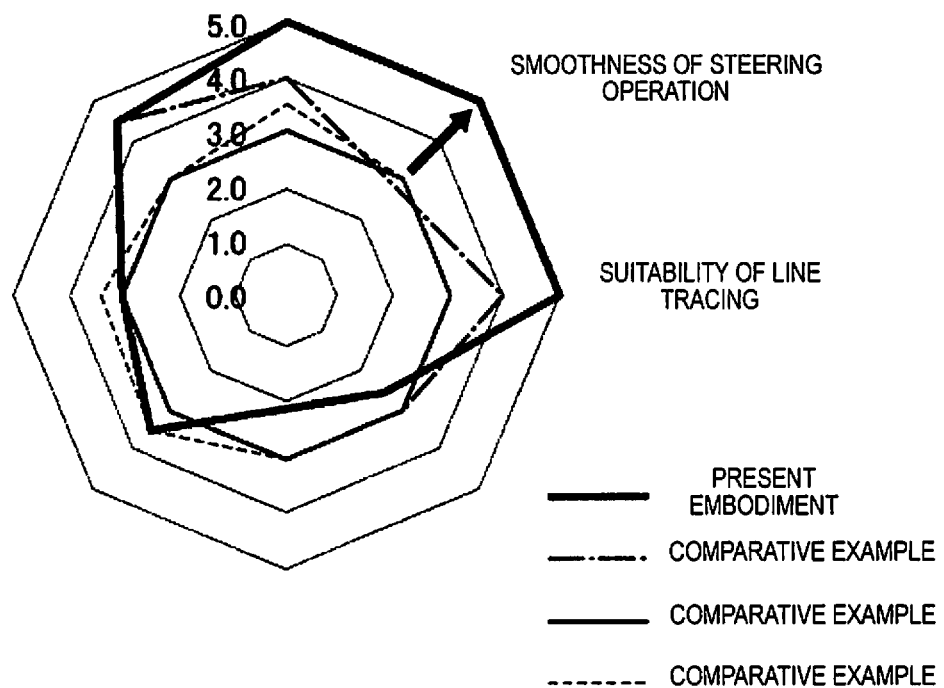
FIG. 7 is an evaluation graph representing evaluation results for the first embodiment and comparative examples.

FIG. 7 is a graph representing evaluation results for the first embodiment and comparative examples during autonomous driving. As shown in FIG. 7, an evaluation of smoothness of a steering operation was low in a plurality of comparative examples. This is an evaluation affected by the impression derived from vibration (jerking) of the steering wheel 11 as described above.

The case of the first embodiment is described next.

Cases where Target Turning Angle Command is Corrective Turning Region

In the first embodiment, the turning command angle and the steering command angle are distributed in the steering angle/turning angle ratio-adjusting unit 411 of the turning angle servo control unit 41 according to the target turning angle command outputted by the autonomous driving controller 100.

In this distribution, in the case of a corrective turning region in which the target turning angle command is equal to or less than the angle threshold value θlim and equal to or greater than the angular velocity threshold value ωlim, it is determined that the target turning angle command is for corrective turning, the distribution to the steering command angle is set to "zero," and only a turning command angle is generated.

Therefore, while turning for corrective turning is performed on the left and right front wheels 5FL, 5FR and the line tracing control is smoothly executed, the steering wheel 11 is not caused to revolve (is not steered) in a manner corresponding to the corrective turning.

Thus, incremental revolving (jerking) that corresponds to corrective turning does not occur in the steering wheel 11. This prevents a sense of discomfort derived from jerking of the steering wheel 11 from being imparted to a driver, and prevents the imparting of an impression that movement of the steering wheel 11 is not smooth. In FIG. 7, the thick line indicates evaluation results for the first embodiment, and it is apparent that the evaluation of smoothness of a steering operation for the first embodiment is superior to that for the comparative examples.

Furthermore, as shown in FIG. 7, the evaluation of adequacy of line tracing is high in the evaluation results for the first embodiment. In one aspect, this means that when the target turning angle command is the corrective turning region as described above, in certain instances there will be no cancelling of the turning of the left and right front wheels 5FL, 5FR. In addition, a resilience that corresponds to the yaw angle and the lateral position is computed when the autonomous driving controller 100 generates the target turning angle command, and the target turning angle command is generated based on the resilience.

Cases where Target Turning Angle Command is Non-Corrective Turning Region

In the case of a non-corrective turning region in which the target turning angle command is greater than the angle threshold value θlim or less than the angular velocity threshold value ωlim, it is determined that the target turning angle command is for gradual, extended-movement-range steering (non-corrective turning). In this instance, the steering angle/turning angle ratio-adjusting unit 411 of the turning angle servo control unit 41 generates both the turning command angle and the steering command angle from the target turning angle command (step S3).

Therefore, while the left and right front wheels 5FL, 5FR are turned and the line tracing control is executed, the steering wheel is steered in accordance with the turning angle, and the driver can visually recognize the turning of the host vehicle and the turning amount according to the movement of the steering wheel 11.

Furthermore, the steering angle delay compensation unit 412 imparts a delay to the turning command angle formed by the target turning angle command for performing such gradual, extended-movement-range steering, the delay being set in consideration of an amount commensurate with a delay derived from the weight of the steering wheel. Therefore, while the left and right front wheels 5FL, 5FR are turned by a command that is set in consideration of the delay and line tracing properties are improved, the steering wheel 11 can be smoothly steered in a manner that does not resist manipulation by the driver.

Effects of the First Embodiment

Effects of the method for controlling steering of a vehicle and the device for controlling steering of a vehicle of the first embodiment are listed below.

1) The vehicle steering control method of the first embodiment is used in a vehicle comprising:

a steering wheel 11, left and right front wheels 5FL, 5FR that are used as turnable wheels and are mechanically detached from the steering wheel 11, a reaction force motor 13 that is used as a steering actuator that imparts steering reaction force torque to the steering wheel 11, a turning motor 23 that is used as a turning actuator that causes the left and right front wheels 5FL, 5FR to turn, and a steering/turning controller 4 that is used as a control device that drives the reaction force motor 13 and the turning motor 23 based on travel environment information and controlling both a steering angle of the steering wheel 11 and a turning angle of the left and right front wheels 5FL, 5FR, and the method comprising:

creating a target turning angle command based on the travel environment information being inputted (step S1);

determining whether the target turning angle command is a corrective turning region (first turning angle command region), in which an angle is equal to or less than an angle threshold value θlim and an angular velocity is equal to or greater than an angular velocity threshold value ωlim, or a non-corrective turning region (second turning angle command region) other than the corrective turning region (step S2);

when a steering command angle and a turning command angle are generated based on the target turning angle command, a distribution of the steering command angle in cases where the target turning angle command is the corrective turning region is kept lower than a distribution of the steering command angle in cases where the target turning angle command is the non-corrective turning region (S3); and the reaction force motor 13 is driven in accordance with the steering command angle, and the turning motor 23 is driven in accordance with the turning command angle (S5, S8).

Therefore, in cases where corrective turning is performed frequently during line tracing control, when the angle and the angular velocity of the target turning angle command are the corrective turning region, the distribution of the steering command angle is minimized and movement of the steering wheel 11 is minimized.

Thus, it is possible to minimize a sense of discomfort imparted to a driver by movement such as jerking of the steering wheel 11.

In particular, in the first embodiment, the distribution from the target turning angle command to the steering command angle is set to "zero," and therefore it is possible to prevent the appearance of movement of the steering wheel 11. Thus, it is possible to reliably minimize a sense of discomfort imparted to the driver due to movement of the steering wheel 11.

2) The method for controlling steering of a vehicle of the first embodiment is such that when in the corrective turning command region, the steering command angle is not generated and only the turning command angle is generated, and when in the non-corrective turning command region, both the steering command angle and the turning command angle are generated from the target turning angle command. Therefore, when corrective turning is performed frequently, the steering wheel 11 does not move at all in the corrective turning control region of the target turning angle command, and it is possible to more reliably prevent the imparting of a sense of discomfort to the driver. In addition, when gradual, extended-movement-range steering, which is non-corrective turning, is performed, the steering wheel 11 is steered when the left and right front wheels 5FL, 5FR are turned, and it is possible to visually notify the driver that the host vehicle is turning.

3) The method for controlling steering of a vehicle of the first embodiment is such that the corrective turning control region is a region having an angle equal to or less than an angle threshold value $\theta$lim and an angular velocity equal to or greater than an angular velocity threshold value $\omega$lim, the threshold values corresponding to corrective turning during a line tracing control for traveling along a target travel line. This makes it possible to reliably minimize movement of the steering wheel 11 for corrective turning during the line tracing control.

4) The method for controlling steering of a vehicle of the first embodiment is such that when the turning command angle is generated in the steering angle/turning angle ratio-adjusting unit 411 from the target turning angle command in the corrective turning command region, a low-frequency component that has passed through a low-pass filter 411a is subtracted and the turning command angle is generated from a high-frequency component of the target turning angle command that has passed through a limiter unit 411b.

Therefore, it is possible for turning that corresponds to highly precise corrective fine steering to be reflected in the turning command angle.

5) The method for controlling steering of a vehicle of the first embodiment is such that in the non-corrective region, when the steering command angle is generated in the steering angle/turning angle ratio-adjusting unit 411 from the target turning angle command, the steering command angle is generated in an inverse-variable-gear-ratio-setting unit 421 by imparting an inverse variable gear ratio to the turning command angle. Therefore, it is possible to steer the steering wheel 11 when the left and right front wheels 5FL, 5FR are turned and to cause the steering wheel 11 to move by an amount similar to that when the wheels are turned. This makes it possible to inform the driver that the host vehicle is turning by movement of the steering wheel 11, and also to visually inform the driver of the turning amount by an amount of revolving of the steering wheel 11.

6) The method for controlling steering of a vehicle of the first embodiment is such that the target turning angle command is generated based on at least one of a yaw angle and a yaw rate. Therefore, it is possible to improve line tracing properties in the line tracing control. Specifically, when a yaw angle is generated due to interference, etc., it is possible to reduce the yaw angle and improve the stability of the vehicle with respect to the interference. This makes it possible to improve the line tracing, as indicated in the evaluation results in FIG. 7.

7) The method for controlling steering of a vehicle of the first embodiment is such that the turning command angle is compensated by a steering angle delay compensation unit by an amount commensurate with a delay derived from a weight of the steering wheel 11. Therefore, in the steering angle servo control unit 42, when a servo having low responsiveness is used, although a delay occurs in steering due to the weight of the steering wheel 11, it is possible to compensate for this delay and turn the vehicle. This makes it possible to steer the steering wheel 11 smoothly in a manner that does not resist manipulation by the driver while improving the line tracing properties as described above.

8) The vehicle steering control method according to the first embodiment is used in a vehicle comprising a steering wheel 11, left and right front wheels 5FL, 5FR that are used as turnable wheels and are mechanically detached from the steering wheel 11, a reaction force motor 13 that is used as a steering actuator for imparting steering reaction force torque to the steering wheel 11, a turning motor 23 that is used as a turning actuator for causing the left and right front wheels 5FL, 5FR to turn, and a steering/turning controller 4 that is used as a control device for controlling the reaction force motor 13 and the turning motor 23 based on travel environment information, the method being such that the steering/turning controller 4:

inputs a target turning angle command created based on the travel environment information (S1);

determines whether the target turning angle command is a corrective turning region (first turning angle command region), in which an angle is equal to or less than an angle threshold value $\theta$lim and an angular velocity is equal to or greater than an angular velocity threshold value $\omega$lim, or a non-corrective turning region (second turning angle command region) other than the corrective turning region (step S2);

when generating a steering command angle and a turning command angle based on the target turning angle command, keeps a distribution of the steering command angle in cases where the target turning angle command is the corrective turning region lower than a distribution of the steering command angle in cases where the target turning angle command is the non-corrective turning region (S3); and drives the reaction force motor 13 in accordance with the steering command angle, and drives the turning motor 23 in accordance with the turning command angle (S5, S8).

Therefore, in cases where corrective turning is performed frequently during line tracing control, when the angle and the angular velocity of the target turning angle command are the corrective turning region, the distribution of the steering command angle is minimized and movement of the steering wheel 11 is minimized. Thus, it is possible to minimize a sense of discomfort imparted to a driver by movement such as jerking of the steering wheel 11. In particular, in the first embodiment, the distribution from the target turning angle command to the steering command angle is set to "zero," and therefore it is possible to prevent the appearance of movement of the steering wheel 11. Thus, it is possible to reliably minimize a sense of discomfort imparted to the driver due to movement of the steering wheel 11.

The method for controlling steering of a vehicle and the device for controlling steering of a vehicle of the present disclosure are described above based on an embodiment, but the present disclosure is not limited to this embodiment in terms of specific configuration; various design changes or additions are permitted, provided that such modifications do not depart from the gist of the invention as in the claims.

For example, in the embodiment above, the turning motor and the reaction force motor were indicated as the turning actuator and the steering actuator, respectively, but the present invention is not limited thereto; an actuator other than a motor can be used. Furthermore, in the embodiment above, the steering wheel and the turnable wheels are mechanically detached when the steering clutch is disengaged, and these elements can be mechanically connected by engaging the steering clutch, but the present invention is not limited thereto. Specifically, a configuration can be applied in which the steering wheel and the turnable wheels are detached completely so as not to mechanically connect at all.

An example was described in which, in keeping the distribution to the steering command angle lower when the target turning angle command is in the first turning angle command region (corrective turning command region), in which the angular velocity is equal to or greater than a prescribed value, than when in the second turning angle command region (non-corrective turning command region), the distribution is set to "zero." However, the distribution should be relatively reduced with respect to the steering command angle when in the second turning angle command region (non-corrective turning command region), and need not be set to "zero." For example, a distribution amount can be variably set so that the distribution to the steering command angle is reduced as the turning angle of the target turning command angle decreases or as the angular velocity increases. The essential point is that the distribution to the steering command angle should be kept lower in the first turning angle command region (corrective turning command region) than in the second turning angle command region (non-corrective turning command region).

In addition, although it was indicated in the embodiment above that the autonomous driving controller generates the target turning angle command when executing line tracing control as an autonomous driving control, the present invention is not limited thereto. For example, the target turning angle command can be generated according to, inter alia, a control for following a preceding vehicle. Alternatively, even when the present invention is applied during travel other than high-speed travel, such as when parking or another type of low-speed travel, it is basically possible to minimize steering wheel movement that is not necessary as information for notifying about turning.

In addition, in the embodiment above, it was indicated that during distribution from the target turning angle command to the turning command angle, the turning command angle is generated from a high-frequency component of the target turning angle command, a low-frequency primary delay component corresponding to the steering angle is added to the generated angle, and the resulting sum is used as the turning command angle, but the present invention is not limited thereto. For example, the target turning angle command can be used as the turning command angle without any modification.

In addition, although it was indicated in the embodiment above that the target turning angle command is generated from the yaw angle, the yaw angle or the yaw rate with respect to a target of line tracing should be known, and the target turning angle command can be generated from the yaw rate or from a both the yaw angle and the yaw rate.

The invention claimed is:

1. A vehicle steering control method for a vehicle that comprises
   a steering wheel,
   turnable wheels that are mechanically detached from the steering wheel,
   a steering actuator configured to impart a steering reaction force torque to the steering wheel,
   a turning actuator configured to cause the turnable wheels to turn, and
   a controller configured to drive the steering actuator and the turning actuator based on travel environment information and to control both a turning angle of the turnable wheels and a steering angle of the steering wheel; and
   the vehicle steering control method comprising:
   creating a target turning angle command based on the travel environment information being inputted;
   determining whether the target turning angle command is in a first turning angle command region in which an angle is equal to or less than a prescribed value and an angular velocity is equal to or greater than a prescribed value, or in a second turning angle command region other than the first turning angle command region;
   generating a steering command angle and a turning command angle based on the target turning angle command and maintaining a lower distribution of the steering command angle in cases where the target turning angle command is in the first turning angle command region as compared to a distribution of the steering command in cases where the target turning angle command is the second turning angle command region; and
   driving the steering actuator in accordance with the steering command angle, and driving the turning actuator in accordance with the turning command angle.

2. The vehicle steering control method according to claim 1, wherein
   the steering command angle is not generated and only the turning command angle is generated when in the first turning angle command region, and both the steering command angle and the turning command angle are generated from the target turning angle command when in the second turning angle command region.

3. The vehicle steering control method according to claim 1, wherein
the first turning angle command region is an angle and an angular velocity that correspond to corrective turning during travel along a target travel line.

4. The vehicle steering control method according to claim 1, wherein
the turning command angle is generated from a high-frequency component of the target turning angle command when the turning command angle is generated from the target turning angle command in the first turning angle command region.

5. The vehicle steering control method according to claim 1, further comprising
applying an inverse variable gear ratio to the turning command angle when the steering command angle is generated from the target turning angle command in the second turning angle command region, the inverse variable gear ratio being a ratio that is an inverse of a variable gear ratio applied to the turnable wheels as pertains to steering of the steering wheel.

6. The vehicle steering control method according to claim 1, wherein
the target turning angle command is generated based on at least one of a yaw angle and a yaw rate.

7. The vehicle steering control method according to claim 1, wherein
the turning command angle is compensated by an amount commensurate with a delay portion derived from a weight of the steering wheel.

8. A vehicle steering control device for a vehicle that comprises
a steering wheel,
turnable wheels that are mechanically detached from the steering wheel,
a steering actuator configured to impart steering reaction force torque to the steering wheel,
a turning actuator configured to cause the turnable wheels to turn, and
a controller configured to control the steering actuator and the turning actuator based on travel environment information,
the controller being configured to perform a process of:
determining whether a target turning angle command is in a first turning angle command region in which an angle is equal to or less than a prescribed value and an angular velocity is equal to or greater than a prescribed value, or in a second turning angle command region other than the first turning angle command region;
generating a steering command angle and a turning command angle based on the target turning angle command, and maintaining a lower distribution of a steering command angle in cases where the target turning angle command is in the first turning angle command region as compared to a distribution of the steering command in cases where the target turning angle command is the second turning angle command region; and
driving the steering actuator in accordance with the steering command angle, and driving the turning actuator in accordance with the turning command angle.

* * * * *